United States Patent
Gortsas

(10) Patent No.: US 11,066,029 B2
(45) Date of Patent: Jul. 20, 2021

(54) METHOD FOR ACTIVATING AT LEAST ONE SECONDARY FUNCTION OF AN OCCUPANT PROTECTION SYSTEM OF A VEHICLE

(71) Applicant: Robert Bosch GmbH, Stuttgart (DE)

(72) Inventor: Nikolaos Gortsas, Sindelfingen (DE)

(73) Assignee: Robert Bosch GmbH, Stuttgart (DE)

( * ) Notice: Subject to any disclaimer, the term of this patent is extended or adjusted under 35 U.S.C. 154(b) by 162 days.

(21) Appl. No.: 16/483,658

(22) PCT Filed: Jan. 24, 2018

(86) PCT No.: PCT/EP2018/051660
§ 371 (c)(1),
(2) Date: Aug. 5, 2019

(87) PCT Pub. No.: WO2018/149600
PCT Pub. Date: Aug. 23, 2018

(65) Prior Publication Data
US 2020/0031302 A1    Jan. 30, 2020

(30) Foreign Application Priority Data
Feb. 16, 2017   (DE) .......................... 102017202534.4

(51) Int. Cl.
*B60R 21/0132*   (2006.01)
*B60R 21/0136*   (2006.01)
*B60R 21/00*     (2006.01)

(52) U.S. Cl.
CPC .... *B60R 21/01336* (2014.12); *B60R 21/0136* (2013.01); *B60R 2021/0018* (2013.01);
(Continued)

(58) Field of Classification Search
CPC .......... B60R 21/01336; B60R 21/0136; B60R 21/0132; B60R 2021/0027;
(Continued)

(56) References Cited

U.S. PATENT DOCUMENTS

| 5,610,575 A * | 3/1997 | Gioutsos ............ B60G 17/0162 180/282 |
| 8,838,288 B2 * | 9/2014 | Takahashi ............... G06F 17/00 701/1 |

(Continued)

FOREIGN PATENT DOCUMENTS

| DE | 102008004307 A1 | 8/2008 |
| DE | 102008040295 A1 | 1/2010 |

(Continued)

OTHER PUBLICATIONS

International Search Report for PCT/EP2018/051660, dated May 4, 2018.

*Primary Examiner* — Michael J Zanelli
(74) *Attorney, Agent, or Firm* — Norton Rose Fulbright US LLP; Gerard Messina

(57) ABSTRACT

A method, a device and a computer program for activating a secondary function of an occupant protection system, a vertical acceleration and a lateral acceleration being detected and evaluated and an instantaneous position of the vehicle being determined based on the vertical acceleration and the first lateral acceleration. In the process, a lifting-off of the vehicle and/or an impact of the vehicle on its wheels is detected. A secondary function is activated if an impact of the vehicle on its roof and/or if an impact of the vehicle on one side or an impact of the vehicle on its wheels is detected.

14 Claims, 3 Drawing Sheets

(52) U.S. Cl.
CPC ............... *B60R 2021/0027* (2013.01); *B60R 2021/01322* (2013.01); *B60R 2021/01325* (2013.01)

(58) Field of Classification Search
CPC ........... B60R 2021/01322; B60R 2021/01325; B60R 2021/0018
See application file for complete search history.

(56) References Cited

U.S. PATENT DOCUMENTS

| | | | |
|---|---|---|---|
| 2002/0135168 A1* | 9/2002 | Mattes | ................. B60R 21/013 280/735 |
| 2006/0095182 A1* | 5/2006 | Lahmann | ............ B60R 21/0132 701/45 |
| 2008/0255717 A1 | 10/2008 | Lich et al. | |
| 2011/0178683 A1 | 7/2011 | Doerr et al. | |
| 2018/0105126 A1* | 4/2018 | Leirich | ................. G07C 5/008 |

FOREIGN PATENT DOCUMENTS

| | | | |
|---|---|---|---|
| EP | 2058180 | A2 | 5/2009 |
| EP | 2065263 | A1 | 6/2009 |
| EP | 2289753 | A1 | 3/2011 |
| RU | 2298494 | C1 | 5/2007 |

\* cited by examiner

METHOD FOR ACTIVATING AT LEAST ONE SECONDARY FUNCTION OF AN OCCUPANT PROTECTION SYSTEM OF A VEHICLE

FIELD OF THE INVENTION

The present invention is directed to a method for activating at least one secondary function of an occupant protection system of a vehicle. The present invention also relates to a device, which is configured to carry out the method for activating at least one secondary function of an occupant protection system of a vehicle, and a computer program for carrying out steps of the method for activating at least one secondary function of an occupant protection system of a vehicle.

BACKGROUND INFORMATION

Various systems for rollover detection of vehicles, which may be subdivided into two classes, discussed in the related art. In these systems rotation rate-based approaches are used for activating time-critical primary functions of an occupant protection system, such as airbag systems, restraint systems etc. Acceleration-based approaches are generally used in order to be able to cost-efficiently present and implement non-time-critical secondary functions of such an occupant protection system such as, for example, placing an emergency call, unlocking vehicle doors, cutting off a fuel supply, etc. Acceleration-based approaches known from the related art are aimed primarily at detecting a stable side position or roof position after a rollover. In addition, it is possible to detect the lifting-off of the vehicle based on the vertical acceleration, in order to therefore obtain a rough estimation for a rollover. In connection with this, a false positive detection of a rollover may take place in load situations and an emergency call may be placed, even though no rollover has occurred. In systems in which, in addition to an emergency call, the fuel supply is cut off in the case of a detected rollover, the impact on the vehicle may also be more severe. Acceleration-based approaches that are aimed at detecting a stable final position are also unable to correctly detect 360° rollovers.

A method for detecting the position of a vehicle is discussed, for example, in DE 10 2008 004 307 A1. In this method, the data of at least one rotation rate sensor and one acceleration sensor are evaluated in order to detect whether the vehicle is situated in a roof position, an automatic unlocking of the vehicle taking place upon detection of a roof position of the vehicle.

A generic method for detecting a lateral position and/or a roof position of a vehicle is discussed in DE 10 2008 040 295 A1. The method includes the steps: receiving a lateral value and/or a vertical value via an interface, the lateral value representing a lateral acceleration and/or the vertical value representing a vertical acceleration; detecting the roof position of the vehicle if the vertical value or a position value derived from the vertical value at least in one component is larger in absolute terms than a predetermined vertical threshold value and/or detecting the lateral position of the vehicle if a position value derived from the vertical value and the lateral value is located in a lateral position region of a state space, the state space extending through axes relating to lateral acceleration and vertical acceleration. In addition, an upright position of the vehicle is detected if the position value was located in lateral position region, but is no longer located in the lateral position region after a predetermined lateral position time period and/or if in at least one component the position value has assumed a value which was larger than the vertical threshold value, but in the at least one component has assumed a value which is no longer larger than the vertical threshold value after the predetermined roof position time period. Safety functions may include, for example, opening the door locks, activating an interior lighting of the vehicle and/or stopping the engine as a function of the detected position of the vehicle.

SUMMARY OF THE INVENTION

The method for activating at least one secondary function of an occupant protection system of a vehicle, including the features of as described herein, has the advantage that a vehicle rollover, which did not result in a final position on the roof or on the side, but may be a 360° rollover, may be detected with a purely acceleration-based approach. This results in the possibility of implementing cost-efficient approaches for detecting rollovers for activating non-time-critical secondary functions, such as placing an emergency call, unlocking the doors and/or cutting off a fuel supply in order to minimize the danger of fire.

Specific embodiments of the present invention are able to reliably and robustly detect rapid 360° rollovers. The assumption of the invention is that ground contact will predominate at various points in time during a 360° rollover. This results in characteristic signal profiles in the lateral and in the vertical acceleration direction, which may be used to check the plausibility of the situation. By detecting a lateral position and/or a roof position before the vehicle lands on its wheels again, it is possible to reliably detect slowly rotating 360° rollovers. This results in the possibility of achieving a high degree of detection of 360° rollovers in a robust overall approach. The core of the present invention is based on the evaluation of characteristic signal profiles in the lateral and vertical acceleration direction during a 360° rollover with ground contact. With this approach, long free-flight phases, in which 360° rollovers are possible with no ground contact and which end with a hard impact of the vehicle on its wheels, may also result in an activation of the at least one secondary function.

Specific embodiments of the present invention provide a method for activating at least one secondary function of an occupant protection system of a vehicle. In this method, a vertical acceleration in the vehicle vertical direction and a lateral acceleration in the vehicle transverse direction are detected and evaluated. An instantaneous position of the vehicle is determined based on the vertical acceleration or on a variable derived therefrom and on the first lateral acceleration or on a variable derived therefrom. In the process, a lifting-off of the vehicle is detected if the vertical acceleration or a variable derived therefrom meets a predefined first criterion. An impact of the vehicle on its wheels is detected if the vertical acceleration or a variable derived therefrom meets a predefined second criterion. In addition, a first time window between the detected lifting-off of the vehicle and the detected impact of the vehicle on its wheels is ascertained. The at least one secondary function is activated if during the first time window the vertical acceleration or a variable derived therefrom meets a third criterion, which represents an impact of the vehicle on its roof, and/or the lateral acceleration or a variable derived therefrom meets a fourth criterion, which represents an impact of the vehicle on its side, or if the first time window exceeds a predefined time period and the detected impact of the vehicle on its wheels meets a predefined fifth criterion, which represents an impact with a subsequent rest position.

A rest position in the present case is understood to be a state of the vehicle, in which the vehicle does not move or moves merely constantly at a minimal speed. The rest position may already exist when the vehicle has not yet come to a full stop. The rest position essentially indicates that after the completed 360° rollover, no further rollover or a tipping of the vehicle is to be expected.

A device is also provided, which is configured to carry out the method for activating at least one secondary function of an occupant protection system of a vehicle. The device in this case includes a first sensor, which detects a vertical acceleration in the vehicle vertical direction, a second sensor, which detects a lateral acceleration in the vehicle transverse direction, and an evaluation and control unit, which receives and evaluates the detected vertical acceleration and the detected lateral acceleration and determines an instantaneous position of the vehicle based on the vertical acceleration and on the first lateral acceleration.

A further aspect of the invention relates to a computer program for carrying out the steps of the method for activating at least one secondary function of an occupant protection system of a vehicle when the computer program is executed on a computer.

The evaluation and control unit may be understood in the present case to be an electrical device such as, for example, a control unit, in particular, an airbag control unit, which processes and evaluates detected sensor signals. The evaluation and control unit may include at least one interface, which may be configured in hardware and/or in software. If configured in hardware, the interfaces may, for example, be part of a so-called system ASIC, which includes a wide variety of functions of the evaluation and control unit. However, it is also possible that the interfaces are dedicated, integrated circuits or are made at least partially of discrete components. If configured in software, the interfaces may be software modules, which are present in a microcontroller, for example, in addition to other software modules. A computer program product, including program code, which is stored on a machine-readable medium, such as a semiconductor memory, a hard disk memory or an optical memory, and which is used for carrying out the evaluation when the program is executed on the evaluation and control unit, is also advantageous.

Advantageous improvements to the method specified herein for activating at least one secondary function of an occupant protection system of a vehicle and to the device specified herein for carrying out the method are possible with the measures and refinements cited in the further descriptions herein.

It is particularly advantageous that a longitudinal acceleration in the vehicle longitudinal direction may be detected and evaluated. Thus, it is advantageously possible to check the plausibility of a detected hard impact of the vehicle on its wheels.

In an advantageous embodiment of the method, the first criterion may be met if the vertical acceleration or a variable derived therefrom exceeds a predefined first threshold value. It may be called a lifting-off of the vehicle, in principle, if the vertical acceleration is with low frequency below a negative threshold. The first criterion is detected by evaluating the vertical acceleration. This may take place via a suitable low-pass filtering with a subsequent comparison against the first threshold value. If the first threshold value is exceeded, a counter, for example, may be started, which is stopped if an impact of the vehicle on its wheels is detected. If the state lasts for a sufficient length of time and the counter exceeds a predefined threshold, the lifting-off of the vehicle may then be detected. During the lifted-off state or free-flight of the vehicle, the value of the detected vertical acceleration generally corresponds to a negative value, which is intended to compensate for the value of the gravitational acceleration. The first threshold value therefore has a negative sign. The second criterion may also be met if the vertical acceleration or a variable derived therefrom exceeds a predefined second threshold value. In this case, the second threshold value corresponds to an acceleration value, which has a sign different from the acceleration value of the first threshold value.

In another advantageous embodiment of the method, the third criterion may be met and an impact of the vehicle on its roof may be detected if the vertical acceleration or a variable derived therefrom exceeds a predefined third threshold value. The third threshold value has a sign different from the second threshold value, since the direction of the acceleration acting in the case of a roof impact is opposite the direction of acceleration acting in the case of an impact on the wheels. If the third criterion is met, it may then be noted or stored for a predefined time period. The fourth criterion may be met and an impact of the vehicle on one side may be detected if the lateral acceleration or a variable derived therefrom exceeds a predefined fourth threshold value or a predefined fifth threshold value. In this case, the fourth threshold value and the fifth threshold value have different signs, since the direction of the acceleration acting on a right vehicle side during an impact is opposite the direction of acceleration acting on the left vehicle side during an impact. If a side contact or impact on the side has been detected, this may then be noted or stored for a predefined time period.

In another advantageous embodiment of the method, the fifth criterion may be met if the vertical acceleration or a variable derived therefrom exceeds a predefined sixth threshold value based on the detected impact of the vehicle on its wheels within a predefined second time window, and the lateral acceleration or a variable derived therefrom exceeds a predefined seventh threshold value and the vertical acceleration or a variable derived therefrom and the lateral acceleration or a variable derived therefrom show no further activities after the predefined second time window. A lifting-off may also occur due to a jump without a rotation, hence, the severity of the impact of the vehicle on its wheels is evaluated, in order to decide whether an activation of the at least one secondary function is indicated. A hard impact is detected if the vertical acceleration has a characteristic high value and then converges toward zero during the second time window. At the same time, such a hard impact of the vehicle on its wheels also results in an oscillating deflection of the lateral acceleration within the second time window due to the shocks. The plausibility of the fifth criterion or the hard impact of the vehicle on its wheels may be ascertained by evaluating the longitudinal acceleration. The fifth criterion may be assessed as plausible if, based on the detected impact of the vehicle on its wheels within the predefined second time window, the longitudinal acceleration or a variable derived therefrom exceeds a predefined eighth threshold value. The rest position after the impact of the vehicle on its wheels is detected in that the acceleration signals show no further activities in the longitudinal, lateral and vertical directions.

In another advantageous embodiment of the method, the at least one secondary function may include an emergency call placement function and/or a door unlocking function and/or a fuel supply cut-off function.

In another advantageous embodiment of the method, the detected accelerations may be filtered before the evaluation.

In another advantageous embodiment of the method, a third sensor may detect the longitudinal acceleration in the vehicle longitudinal direction, whereby the evaluation and control unit may receive and evaluate the longitudinal acceleration. In addition, at least one low-pass filter may filter the detected accelerations.

Exemplary embodiments of the present invention are depicted in the drawing and are explained in greater detail in the following description. In the drawing, identical reference numerals refer to components or elements, which carry out the same or analogous functions.

DETAILED DESCRIPTION

Figure 1:
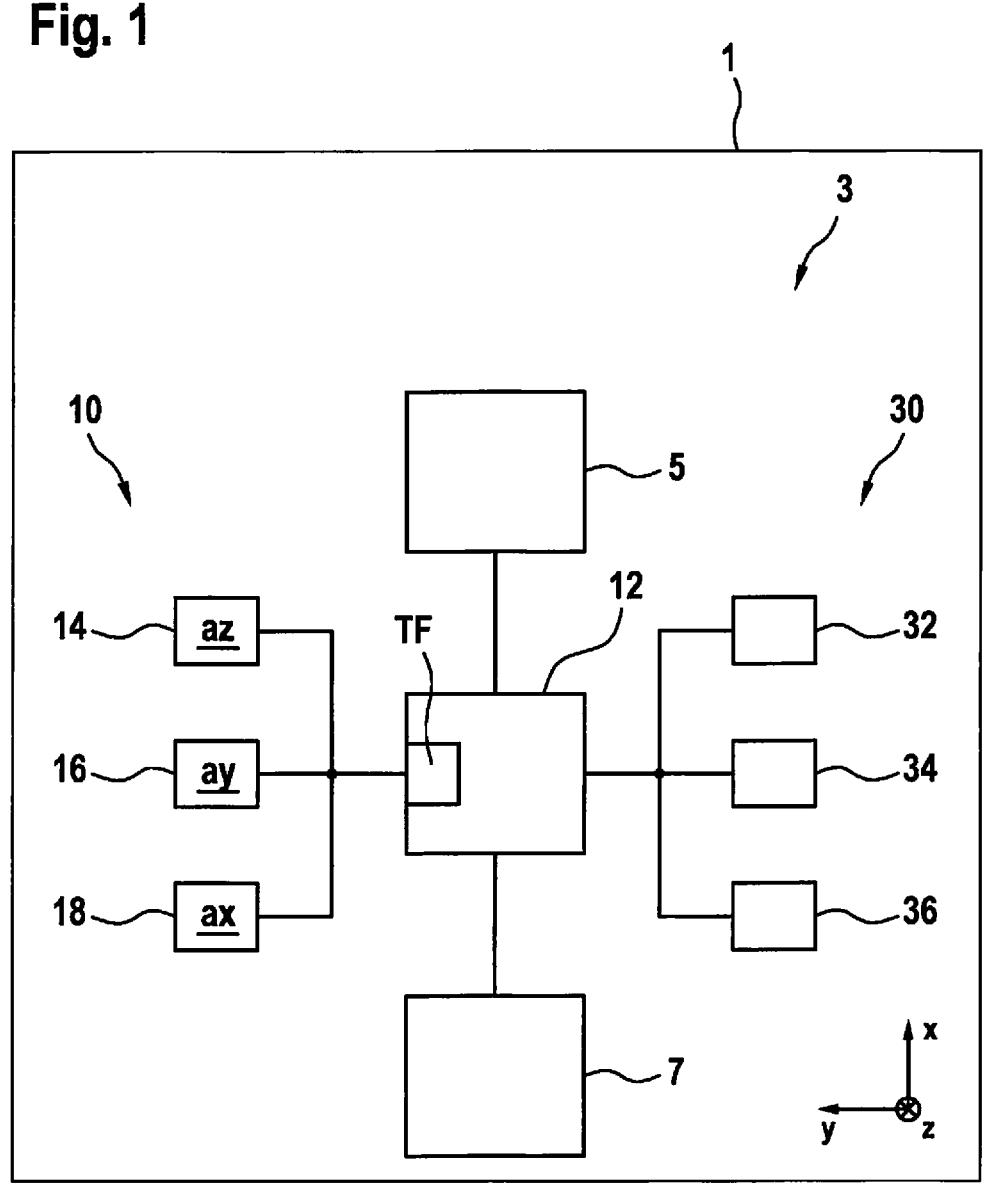
FIG. 1 schematically shows a representation of a vehicle, including an exemplary embodiment of a device for carrying out a method according to the present invention for activating at least one secondary function of an occupant protection system of a vehicle.

As is apparent from FIG. 1, the exemplary embodiment of a vehicle 1 depicted includes an occupant protection system 3, which includes a restraint system 5, an airbag system 7 and an exemplary embodiment of a device 10 according to the present invention. Device 10 is configured to carry out a method 100 depicted in FIG. 2 for activating at least one secondary function 30 of occupant protection system 3 of vehicle 1, and includes a first sensor 14, which detects a vertical acceleration az in vehicle vertical direction z, a second sensor 16, which detects a lateral acceleration ay in vehicle transverse direction y, and an evaluation and control unit 12, which receives and evaluates detected vertical acceleration az and detected lateral acceleration ay and, based on vertical acceleration az and lateral acceleration ay, determines an instantaneous position of vehicle 1.

Device 10 in the exemplary embodiment depicted also includes a third sensor 18, which detects a longitudinal acceleration ax in vehicle longitudinal direction x. Evaluation and control unit 12 receives and evaluates longitudinal acceleration ax. In addition, control and evaluation unit 12 in the exemplary embodiment depicted also uses a low-pass filter TF, which filters detected accelerations ax, ay, az.

Figure 2:
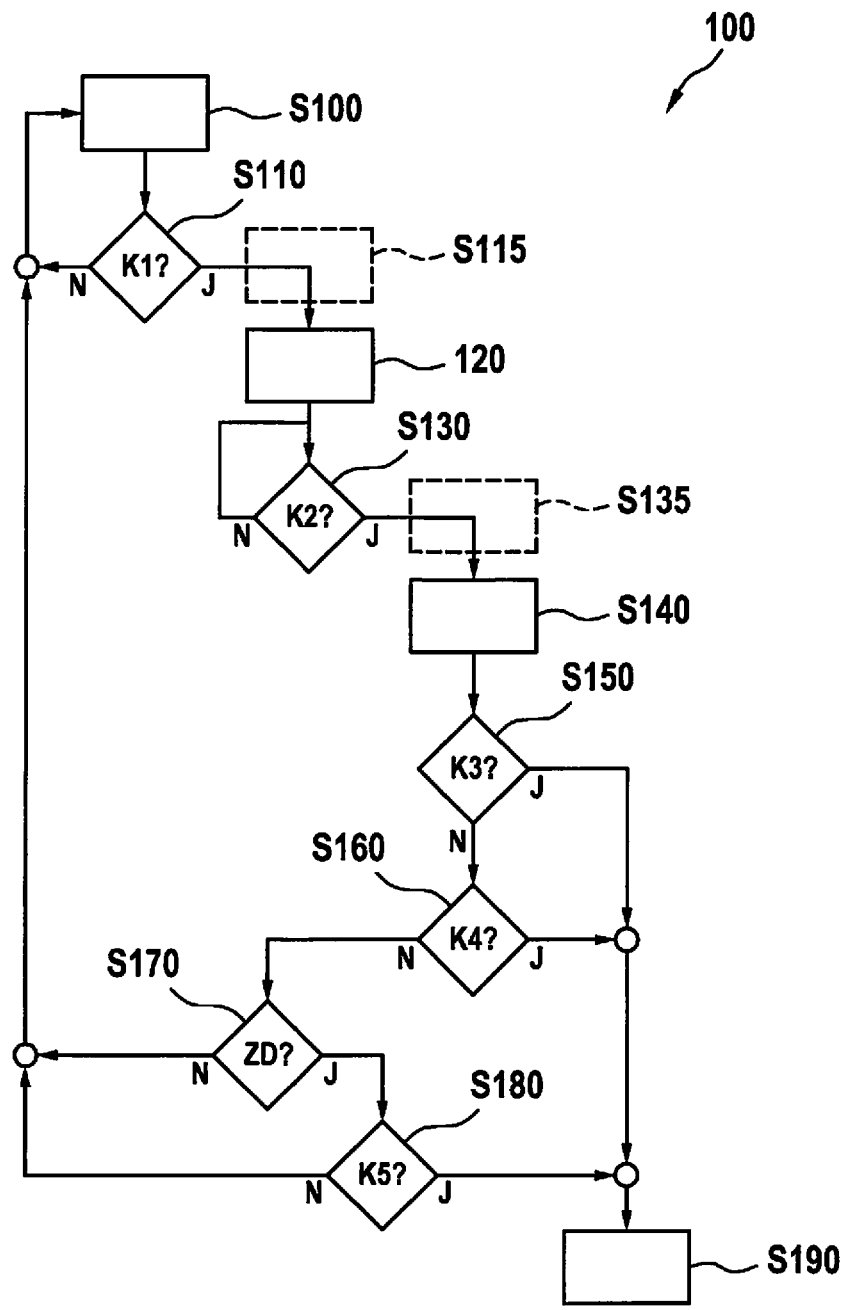
FIG. 2 schematically shows a flow chart of one exemplary embodiment of a method according to the present invention for activating at least one secondary function of an occupant protection system of a vehicle.
Figure 3:
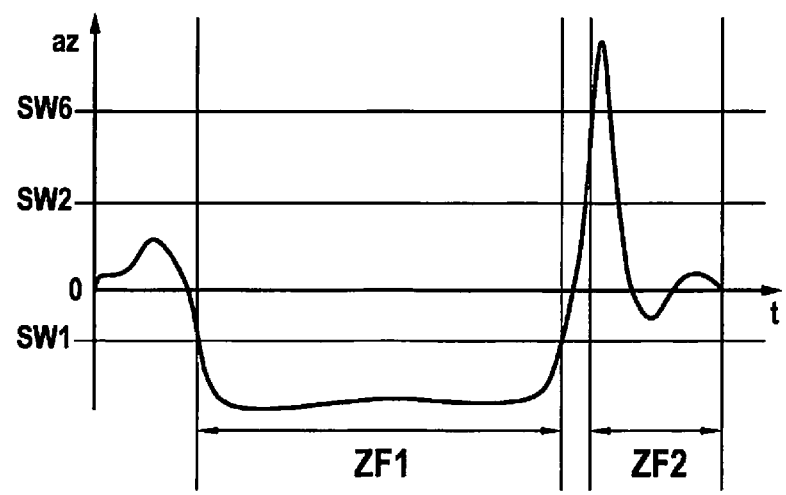
FIG. 3 shows a characteristic curve diagram, including a chronological curve of a vertical acceleration of a vehicle.
Figure 4:
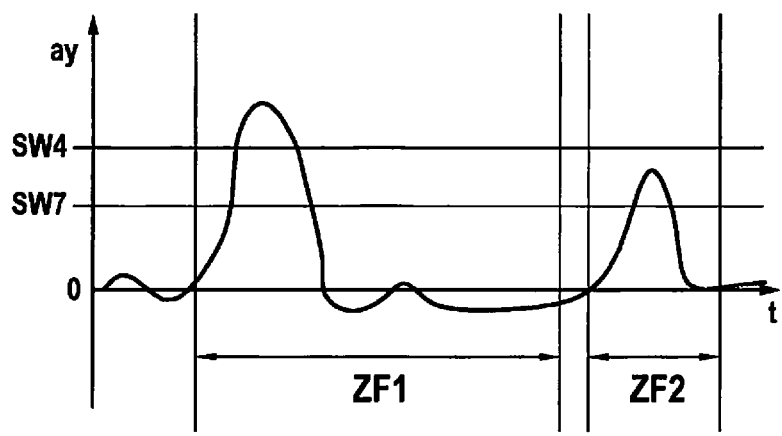
FIG. 4 shows a characteristic curve diagram, including a chronological curve of a lateral acceleration of a vehicle.

As is further apparent from FIGS. 2 through 4, method 100 for activating at least one secondary function 30 of occupant protection system 3 of vehicle 1 detects and evaluates in a step S100 a vertical acceleration az in vehicle vertical direction z. In step S110, it is checked whether vertical acceleration az or a variable derived therefrom meets a predefined first criterion K1, which represents a lifting-off of vehicle 1. If first criterion K1 is not met, the method then returns to step S100. If a lifting-off of vehicle 1 is detected in step S110, then a lateral acceleration ay in vehicle transverse direction y is detected and evaluated in step S120. In step S130, it is checked whether vertical acceleration az or a variable derived therefrom meets a predefined second criterion K2, which represents an impact of vehicle 1 on its wheels. The check is continued until the second criterion is met and an impact of vehicle 1 on its wheels has been detected. In step S140, a first time window ZF1 between the detected lifting-off of vehicle 1 and the detected impact of vehicle 1 on its wheels is ascertained. In order to facilitate the ascertainment of first time window ZF1, after step S110 and a detected lifting-off of vehicle 1, a counter or a stopwatch may be started in an optional step S115 represented by dashed lines. After step S130, and a detected impact of vehicle 1 on its wheels, the counter or the stopwatch may be stopped again in an optional step S135 represented by dashed lines. In step S140, the counter value may then be read out, which represents first time window ZF1. In step S150, it is then checked whether during first time window ZF1 vertical acceleration az or a variable derived therefrom met a third criterion K3, which represents an impact of vehicle 1 on its roof. If such a roof impact of vehicle 1 is detected in step S150, the at least one secondary function 30 is then activated in step S190. If no roof impact is detected in step S150, then it is checked in step S160 whether lateral acceleration ay or a variable derived therefrom meets a fourth criterion K4, which represents an impact of vehicle 1 on one side. If such a side impact of vehicle 1 is detected in step S160, then the at least one secondary function 30 is activated in step S190. If no side impact is detected in step S160, then it is checked in step S170, whether first time window ZF1 exceeds a predefined time period ZD. If no exceedance of time period ZD is detected in S170, then the method returns to step S100. If an exceedance of time period ZD is detected in step S170, then is it checked in step S180 whether the detected impact of vehicle 1 on its wheels meets a predefined fifth criterion K5, which represents a hard impact with a subsequent rest position. If no hard impact with subsequent rest position of vehicle 1 is detected in step S180, then the method returns to step S100. If a hard impact with subsequent rest position of vehicle 1 is detected in S180, then the at least one secondary function 30 is activated in step S190.

The rest position of the vehicle may be ascertained on the one hand via the detected speed (vX) of the vehicle. This is present typically as a vehicle parameter via the vehicle communication bus, for example, the CAN bus.

A further possibility of detecting without taking vehicle speed (vX) into consideration may take place by evaluating the acceleration signals in X direction, Y direction and Z direction (aX, aY, aZ). If these acceleration values assume characteristic values, a final position of the vehicle on the wheels, thus a rest position, is assumed. The characteristic values may be defined by threshold values for the accelerations or by relationships of the accelerations to one another. For example, in that the values for the acceleration in the X direction and Y direction assume nearly the values 0 g and the value for the acceleration in the Z direction assumes a value of nearly 1 g. In addition, the rotation rate values may be evaluated for this purpose, which then also assume a value of nearly 0°/s. The values must be present for a predetermined period of time in order for the rest position to be reliably detected.

In addition, the evaluation of vehicle speed (vX) may be added, in order to improve or to check the plausibility of the evaluation based on the acceleration values and, if necessary, the rotation rate.

The at least one secondary function 30 in the exemplary embodiment depicted includes an emergency call placement function 32, a door unlocking function 34 and a fuel supply cut-off function 36. Still other non-time-critical secondary functions such as, for example, switching on the interior lighting, etc., may of course also be provided. In addition, only emergency call placement function 32 or door unlocking function 34 or a fuel supply cut-off function 36 may also be provided.

In addition to the lateral acceleration, a longitudinal acceleration ax in the vehicle longitudinal direction x may be detected and evaluated in step S120. The detected accelerations ax, ay, az may also be filtered and the filtered acceleration values may be evaluated in addition or alternatively to the acceleration values ax, ay, az.

In the exemplary embodiment depicted, first criterion K1 is detected in step S110 as met, if vertical acceleration az or a variable derived therefrom exceeds a predefined first threshold value SW1. Second criterion K2 is detected as met in step S130 if the vertical acceleration az or a variable derived therefrom exceeds a predefined second threshold value SW2.

In the exemplary embodiment depicted, third criterion K3 is detected as met in step S150 and an impact of vehicle 1 on its roof is detected if vertical acceleration az or a variable derived therefrom exceeds a predefined third threshold value not depicted. In the case of an impact of vehicle 1 on its roof, low-pass filtered vertical acceleration az shows a high negative value, which is compared with the third threshold value. The impact on the roof takes a certain amount of time physically. Vertical acceleration az may be distinguished from signal peaks due to transient interferences, in that it is above the third threshold value for a specific time period. Once third criterion K3 is met, the roof impact is qualified and stored.

In the exemplary embodiment depicted, fourth criterion K4 is detected as met in step S160 and an impact of vehicle 1 on its side is detected if lateral acceleration ay or a variable derived therefrom exceeds a predefined fourth threshold value SW4 or a predefined fifth threshold value not depicted. An impact of vehicle 1 on one side is manifested in a strong acceleration in lateral direction y. Here too, the detection may take place via a low-pass filtered lateral acceleration. Filtered lateral acceleration ay is compared with fourth threshold value SW4. In addition, low-pass filtered vertical acceleration az may also be evaluated for detecting the impact of vehicle 1 on one side which, in the case of a side impact of vehicle 1, shows a negative value.

In the exemplary embodiment depicted, fifth criterion K5 is detected as met in step S180 if, based on the detected impact of vehicle 1 on its wheels within a predefined second time window ZF2, vertical acceleration az or a variable derived therefrom exceeds a predefined sixth threshold value SW6 and lateral acceleration ay or a variable derived therefrom exceeds a predefined seventh threshold value SW7 and vertical acceleration az or a variable derived therefrom and lateral acceleration ay or a variable derived therefrom show no further activities after a predefined second time window ZF2.

FIGS. 3 and 4 schematically depict profiles of vertical acceleration az and lateral acceleration ay during a 360° rollover with a side impact of vehicle 1 during a first time window ZF1. As is apparent from FIG. 4, lateral acceleration ay or a variable derived therefrom exceeds predefined fourth threshold value SW4 during first time window ZF1. In the final phase, vehicle 1 falls with a hard impact on its wheels. As a result, vertical acceleration az in FIG. 3 shows a characteristic high positive value, which is above sixth threshold value SW6 and then converges toward zero. In addition, the hard impact of vehicle 1 on the wheels results in a deflection of lateral acceleration ay in FIG. 4, which is above seventh threshold value SW7. After the impact, vehicle 1 reaches a stationary final state once second time window ZF2 has elapsed. Vertical acceleration az and lateral acceleration ay thus show no further activities.

The plausibility of fifth criterion K5 may also be checked in step S180 by evaluating longitudinal acceleration ax. In this case, fifth criterion K5 is detected as plausible if, based on the detected impact of vehicle 1 on its wheels within predefined second time window ZF2, longitudinal acceleration ax or a variable derived therefrom exceeds a predefined eighth threshold value not depicted and shows no further activities after predefined second time window ZF2.

This method may, for example, be implemented in software or in hardware or in a mixed form of software and hardware, for example, in a control unit. The corresponding computer program for carrying out the steps of method 100 for activating at least one secondary function 30 of an occupant protection system 3 may then be executed in a control unit, such as a data processing system.

What is claimed is:

1. A method for activating at least one secondary function of an occupant protection system of a vehicle, the method comprising:
   detecting and evaluating a vertical acceleration in the vehicle vertical direction and a lateral acceleration in the vehicle transverse direction;
   determining an instantaneous position of the vehicle based on the vertical acceleration or on a variable derived therefrom and on the lateral acceleration or on a variable derived therefrom;
   detecting a lifting-off of the vehicle if the vertical acceleration or a variable derived therefrom meets a predefined first criterion;
   detecting an impact of the vehicle on its wheels if the vertical acceleration or a variable derived therefrom meets a predefined second criterion;
   ascertaining a first time window between the detected lifting-off of the vehicle and the detected impact of the vehicle on its wheels; and
   activating the at least one secondary function activated if, during the first time window, the vertical acceleration or a variable derived therefrom meets a third criterion, which represents an impact of the vehicle on its roof, and/or the lateral acceleration or a variable derived therefrom meets a fourth criterion, which represents an impact of the vehicle on one side, or if the first time window exceeds a predefined time period and the detected impact of the vehicle on its wheels meets a predefined fifth criterion, which represents a hard impact with a subsequent rest position.

2. The method of claim 1, wherein a longitudinal acceleration in the vehicle longitudinal direction is detected and evaluated.

3. The method of claim 1, wherein the first criterion is met if the vertical acceleration or a variable derived therefrom exceeds a predefined first threshold value, the second criterion being met if the vertical acceleration or a variable derived therefrom exceeds a predefined second threshold value.

4. The method of claim 1, wherein the third criterion is met and an impact of the vehicle on its roof is detected if the vertical acceleration or a variable derived therefrom exceeds a predefined third threshold value.

5. The method of claim 1, wherein the fourth criterion is met and an impact of the vehicle on one side is detected if the lateral acceleration or a variable derived therefrom exceeds a predefined fourth threshold value or a predefined fifth threshold value.

6. The method of claim 1, wherein the fifth criterion is met if, based on the detected impact of the vehicle on its wheels within a predefined second time window, the vertical acceleration or a variable derived therefrom exceeds a predefined sixth threshold value and the lateral acceleration or a variable derived therefrom exceeds a predefined seventh threshold value and the vertical acceleration or a variable derived therefrom and the lateral acceleration or a variable derived therefrom shows no further activities after the predefined second time window.

7. The method of claim 6, wherein the plausibility of the fifth criterion is checked by evaluating the longitudinal acceleration, the fifth criterion being plausible if, based on the detected impact of the vehicle on its wheels within the predefined second time window, the longitudinal acceleration or a variable derived therefrom exceeds a predefined eighth threshold value and shows no further activities after the predefined second time window.

8. The method of claim 1, wherein the at least one secondary function includes at least one of: an emergency call placement function; a door unlocking function; and/or a fuel supply cut-off function.

9. The method of claim 1, wherein the detected accelerations are filtered.

10. A device for activating at least one secondary function of an occupant protection system of a vehicle, comprising:
a first sensor to detect a vertical acceleration in the vehicle vertical direction;
a second sensor to detect a lateral acceleration in the vehicle transverse direction; and
an evaluation and control unit to receive and evaluate a detected vertical acceleration and a detected lateral acceleration, and to determine an instantaneous position of the vehicle based on the vertical acceleration and on the lateral acceleration, by performing the following:
detecting and evaluating a vertical acceleration in the vehicle vertical direction and a lateral acceleration in the vehicle transverse direction;
determining an instantaneous position of the vehicle based on the vertical acceleration or on a variable derived therefrom and on the lateral acceleration or on a variable derived therefrom;
detecting a lifting-off of the vehicle if the vertical acceleration or a variable derived therefrom meets a predefined first criterion;
detecting an impact of the vehicle on its wheels if the vertical acceleration or a variable derived therefrom meets a predefined second criterion;
ascertaining a first time window between the detected lifting-off of the vehicle and the detected impact of the vehicle on its wheels; and
activating the at least one secondary function activated if, during the first time window, the vertical acceleration or a variable derived therefrom meets a third criterion, which represents an impact of the vehicle on its roof, and/or the lateral acceleration or a variable derived therefrom meets a fourth criterion, which represents an impact of the vehicle on one side, or if the first time window exceeds a predefined time period and the detected impact of the vehicle on its wheels meets a predefined fifth criterion, which represents a hard impact with a subsequent rest position.

11. The device of claim 10, wherein a third sensor detects a longitudinal acceleration in the vehicle longitudinal direction, the evaluation and control unit receiving and evaluating the longitudinal acceleration.

12. The device of claim 10, wherein at least one low-pass filter filters the detected accelerations.

13. The device of claim 10, wherein the at least one secondary function includes at least one of: an emergency call placement function; a door unlocking function; and/or a fuel supply cut-off function.

14. A non-transitory computer readable medium having a computer program, which is executable by a processor, comprising:
a program code arrangement having program code for activating at least one secondary function of an occupant protection system of a vehicle, by performing the following:
detecting and evaluating a vertical acceleration in the vehicle vertical direction and a lateral acceleration in the vehicle transverse direction;
determining an instantaneous position of the vehicle based on the vertical acceleration or on a variable derived therefrom and on the lateral acceleration or on a variable derived therefrom;
detecting a lifting-off of the vehicle if the vertical acceleration or a variable derived therefrom meets a predefined first criterion;
detecting an impact of the vehicle on its wheels if the vertical acceleration or a variable derived therefrom meets a predefined second criterion;
ascertaining a first time window between the detected lifting-off of the vehicle and the detected impact of the vehicle on its wheels; and
activating the at least one secondary function activated if, during the first time window, the vertical acceleration or a variable derived therefrom meets a third criterion, which represents an impact of the vehicle on its roof, and/or the lateral acceleration or a variable derived therefrom meets a fourth criterion, which represents an impact of the vehicle on one side, or if the first time window exceeds a predefined time period and the detected impact of the vehicle on its wheels meets a predefined fifth criterion, which represents a hard impact with a subsequent rest position.

* * * * *